United States Patent [19]

Hettiarachchy et al.

[11] Patent Number: 4,699,664
[45] Date of Patent: Oct. 13, 1987

[54] STABILIZED NATURAL PIGMENT COMPLEXES

[75] Inventors: Navagnana S. Hettiarachchy, New Milford, Conn.; Dorothy J. Muffett, White Plains, N.Y.; Elaine R. Wedral, Sherman, Conn.

[73] Assignee: Nestec S.A., Vevey, Switzerland

[21] Appl. No.: 729,272

[22] Filed: May 1, 1985

[51] Int. Cl.$^4$ ............................................. C04B 14/00
[52] U.S. Cl. ............................................. 106/288 Q
[58] Field of Search ........................................ 106/288

[56] References Cited

U.S. PATENT DOCUMENTS

| 4,034,764 | 7/1977 | Rainer et al. | 536/3 |
| 4,202,908 | 5/1980 | Nesmeyanov et al. | 426/656 |
| 4,274,830 | 6/1981 | Woznicki et al. | 8/495 |
| 4,339,451 | 7/1982 | Albaum et al. | 426/250 |
| 4,375,481 | 3/1983 | Kuwabara et al. | 426/658 |
| 4,431,628 | 2/1984 | Gaffar | 424/49 |

Primary Examiner—Theodore Morris
Attorney, Agent, or Firm—Vogt & O'Donnell

[57] ABSTRACT

Processes for the preparation of natural pigment complexes which have improved stability against oxygen, heat, light and moisture and which are soluble in aqueous media at acidic pH conditions are disclosed. The pigment complexes produced by these processes are also disclosed.

26 Claims, No Drawings

STABILIZED NATURAL PIGMENT COMPLEXES

BACKGROUND OF THE INVENTION

1. Field of the Invention

This invention pertains to the field of natural pigments. More specifically, the present invention is concerned with the preparation of natural pigment complexes which have improved stability against oxygen, heat, light and moisture and improved water solubility as compared to the corresponding untreated pigments.

2. Description of Related Art

Pigments derived from vegetable or animal sources have long been used for various food and non-food coloring applications.

Such natural pigments as they are called, however, generally suffer from a disadvantage that they are readily susceptible to oxidation, heat, light and moisture degradation. Moreover, some of these natural pigments are either not water-soluble at all (carotenoids) or are not soluble in acidic solutions (bixin, norbixin).

An additional problem with the use of natural pigments, particularly in beverages, is that there is no natural pigment available having a yellow or orange color which is water-soluble at an acidic pH. In certain applications, it is satisfactory to emulsify a fat-soluble yellow pigment to obtain a yellow color. However, in some applications, such as beverages, the clarity that is required can only be met by a water-soluble pigment.

These disadvantages of natural pigments have greatly limited their overall applicability as coloring agents for various end uses. Accordingly, various expedients have been suggested to improve the stability of natural pigments. These have included the use of various additives to the pigments such as ascorbic acid or antioxidants. Alternatively, attempts have been made to control the environment surrounding these natural pigments such as the availability of oxygen, heat, light or moisture.

While these methods have met with some success in improving the stability of the pigments, none of these methods have improved the stability enough to enable the use of such natural pigments in a wide range of applications, particularly food products such as beverages. Moreover, these methods have not solved the problems associated with the water-insolubility of the pigments and particularly the insolubility of the pigments in an aqueous acidic medium.

SUMMARY OF THE INVENTION

Applicants have discovered a process for improving the stability and water-solubility of natural pigments which have one or more carboxyl groups which avoids substantially all of the disadvantages discussed above.

In particular, the process of the present invention produces natural pigment complexes which have improved stability and water-solubility characteristics such that they are able to be used in a wide range of applications which hitherto have been extremely difficult or even impossible. By virtue of the process of the present invention, natural pigment complexes are produced which are water-soluble at acidic conditions, and which are able to provide either a yellow or an orange color at such acidic conditions; which provide better clarity upon dissolution; and which have improved stability against oxidation, heat, light and moisture so as to provide better color retention.

The process comprises interacting a natural pigment containing one or more carboxyl groups with an inorganic polyvalent cation and a hydrocolloid also having one or more carboxyl groups in an aqueous medium at an alkaline pH to form the stabilized pigment complex. It is believed that the treated, stabilized natural pigment comprises a pigment/hydrocolloid complex which is cross-linked either by hydrogen bonding or by ionic bonding through a polyvalent cation bridge to form a complex having the following arrangement:

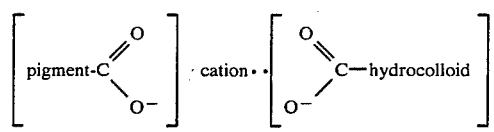

DETAILED DESCRIPTION OF THE INVENTION

The pigments which are susceptible to being treated in the present invention so as to improve their stability and water-solubility are natural pigments derived from vegetable or animal sources which contain one or more carboxyl groups. In addition, the pigments should also be soluble in water under alkaline conditions.

Such pigments include, but are not limited to, bixin (derived from annatto), norbixin (also derived from annatto), betanin (derived from beet roots), vulgaxanthins (also derived from beet roots), crocetin (derived from saffron), and the like.

Also applicable are the synthetically prepared equivalents of the natural pigments which are conventionally referred to as nature-identical pigments. The synthetically prepared pigments are essentially identical in both structure and properties to their naturally derived counterparts.

Any of the above noted pigments may be used individually or in combination with one another.

The norbixin/bixin pigments obtained from annatto seeds may be obtained by any of several means. Annatto color may be obtained commercially, for example, from Miles Laboratories, Inc., Elkart, Indiana, or Chr. Hansen's Laboratory, Inc., Milwaukee, Wis., in either a liquid concentrate or dry powdered form. Alternatively, a liquid annatto extract can be obtained by preparing it directly from annatto seeds (*Bixa orellana*) by well known means. The commercial or prepared annatto extracts can be used directly without further purification being required.

The betanin and vulgaxanthin pigments obtained from beet root may also be obtained by a number of means. Beet color may be obtained commercially, for example, from the Beatrice Foods Company, Chicago, Illinois, in either a liquid concentrate or in spray-dried powder form. Alternatively, a liquid beet extract can be obtained by preparing it, for example, from whole beets (*Beta vulgaris*) by well known means. The commercial or prepared beet extracts can be used directly or, more preferably, after partial purification of the pigments. Such partial purification can be accomplished by fermentation, dialysis, ultrafiltration and similar techniques which are well known to those skilled in the art. See, for example, U.S. Pat. No. 4,027,042 issued to von Elbe, et al. which discloses fermentation as a purification technique.

Generally, from about 0.05 to 6.0 parts by weight and preferably from about 0.1 to 5.0 parts by weight of polyvalent cation are employed per part by weight of pigment on a dry weight basis.

Suitable sources for the polyvalent cation include all the soluble salts of calcium, magnesium, manganese, zinc, copper, iron, aluminum, etc., which may be used individually or in combination. Especially preferred are those cations which are considered food acceptable such as calcium, magnesium and the like. Typical soluble salts of the above cations which are applicable in the present invention include the acetates, carbonates, chlorides, phosphates, sulfates, tartrates, ascorbates, citrates, and the like.

The third component required to form the complex of the present invention is a water-dispersible/water-soluble polymer, i.e., a hydrocolloid, having at least one or more carboxyl groups. Generally, from about 2 to about 400 parts by weight and preferably from about 20 to about 120 parts by weight of the hydrocolloid are employed per part by weight of pigment on a dry weight basis. The upper value for the amount of hydrocolloid employed is for the most part limited by practical viscosity considerations.

Applicable hydrocolloids include but are not limited to, pectins, such as low-methoxyl pectin, high-methoxyl pectin; gums, such as gum arabic, gum tragacanth, xanthan gum, gum karaya; gelatin or hydrolyzed gelatin; modified cellulose, such as carboxymethyl cellulose, etc.; alginates, such as propylene glycol alginate, sodium alginate, potassium alginate, etc.; and the like.

The salts and derivatives of the hydrocolloids are also suitable. One skilled in the art can readily ascertain additional hydrocolloids which are applicable in the present invention. One or more of these hydrocolloids may be used simultaneously.

In the case of some hydrocolloids or hydrocolloid salts, there may already be a sufficient amount of a polyvalent cation present therein so as to reduce or entirely eliminate the need for adding an additional polyvalent cation source. For example, gum arabic contains approximately 0.7% calcium and 0.2% magnesium by weight. Accordingly, when using gum arabic or a similar polyvalent cation containing material, the amount of separately added polyvalent cation source should be adjusted accordingly.

When combining norbixin with gum arabic, for example, the optimum weight ratio of norbixin:polyvalent cation:gum arabic is in the preferred range of from 1:0.3:20 to 1:0.8:80. For other pigments and hydrocolloids, the optimal concentration for any particular combination will vary depending upon the specific pigment and hydrocolloid being used. Generally, a wide latitude can be employed in selecting specific component concentrations, as noted by the above ranges, which will yield satisfactory results.

To stabilize the pigment, the pigment, hydrocolloid and polyvalent cation source are added to an aqueous medium whose pH is adjusted to a value in the range of from 7.5 to 13.5, preferably 8.5 to 13.0, and most preferably 9.5 to 12.0. This alkaline medium helps solubilize the pigment and causes the carboxyl groups of both the pigment and hydrocolloid to dissociate thereby interacting with the polyvalent cation to form the complex of the present invention. Any well known and conventional food acceptable acids or bases may be used to adjust the pH to the required value.

While the various constituents may be combined with one another in any order, it is desirable to first add the pigment to the aqueous medium in an amount of from about 0.01 to 5.0% by weight, preferably from about 0.05 to 1.0% by weight wherein the pH of the aqueous medium is adjusted to the alkaline conditions noted above either before or after the pigment addition.

Preferably, the polyvalent cation source is then added in an amount noted above. It may be added as a dry powder or as part of a solution.

Finally, the hydrocolloid in an amount noted above is added to the aqueous medium. It too can be added as a dry powder or preferably as part of a solution inasmuch as it is more difficult to disperse the hydrocolloid when it is in powdered form.

Desirably, after each component is added to the aqueous medium, the resulting mixture is stirred generally for about 5 to 60 minutes, advantageously for about 10 to 40 minutes. Longer holding times can be employed.

The temperature at which the interaction is carried out is not critical to the process of the present invention. It can take place at a temperature in the range of from about 5° to 80° C., preferably from about 20° to 50° C., and advantageously at ambient temperature.

Without wishing to be bound by theory, it is believed that stabilized natural pigment complexes are formed as a result of a cross-linking that occurs between the pigment and hydrocolloid materials either by hydrogen bonding or by ionic bonding through a polyvalent cation bridge. In other words, one molecule of polyvalent cation will optimally bind to one carboxyl group in the hydrocolloid molecule and one carboxyl group in the pigment molecule.

It is also probable, however, that some of the cations will also bind to two pigment or to two hydrocolloid molecules rather than to only one pigment and one hydrocolloid molecule as desired. Though such side interactions are not believed to be the primary mechanism of this process, they are not detrimental to the preparation of a stabilized natural pigment. It is believed such extraneous complexes as well as uncomplexed pigments are physically entrapped in the matrix of the hydrocolloid such that the resulting treated pigment product has the desired improved stability and solubility characteristics.

After the stabilized pigment complexes are formed, it is desirable, although not necessary, to reduce the pH of the aqueous medium to an acidic value, generally in the range of from about 1 to 7, preferably about 2 to 6, and most desirably to a pH of from about 3 to 3.5. This acidic pH promotes the formation of hydrogen bonding and is beneficial to the stability of many of the treated natural pigments.

The pigment/cation/hydrocolloid complex can be used as a coloring material directly as prepared without purification. No isolation is necessary. It can be used as is in many applications such as in beverages, cheese, etc. Preferably, however, excess water is removed from the aqueous medium so as to provide a concentrated liquid or a dry powdered composition.

The aqueous medium can be concentrated by means well known to those skilled in the art, particularly low temperature evaporation, vacuum distillation, spray drying, vacuum drying, freeze drying, or other similar techniques. Those skilled in the art will readily appreciate that because of the temperature sensitive nature of natural pigments, care should be utilized with the temperatures employed in the vacuum distillation and spray drying techniques. It has been found that vacuum distillation temperatures of from 40° to 90° C. are satisfactory with about 50° to 80° C. being most preferred under a vacuum of from about .73 to .97 kgs/sq. cm. Using this procedure, a liquid concentrate can be prepared with a Brix of from 10° to 35°, beneficially from 20° to 30°. When spray drying is employed to produce a dry powder, it is desirable, although not essential, to add a carrier such as maltodextrin or modified corn starch to the pigment-hydrocolloid complex mixture. Before utilizing the spray drying technique, it is desirable to first remove a major portion of the excess water from the mixture by employing vacuum distillation or a similar technique. Generally, spray drying temperatures of about 120° to 200° C. inlet and 70° to 90° C. outlet have proven satisfactory The concentration of the natural pigment complex in the concentrated liquid or dry powder preparation can vary widely depending upon the starting pigment concentration in the aqueous medium, the ratio of pigment to hydrocolloid employed, the amount of water removal, and other such factors. However, because of the intense color of natural pigments, it has been found sufficient for practical purposes to prepare a liquid concentrate containing from 0.1 to 3.0% by weight of pigment or a dry powder preparation containing at least 1.0% and preferably 2.0 to 10.0% by weight of pigment. The dry preparations can be ground to any suitable particle size and used as a pigment source in dry-mixed products.

The treated natural pigments of the present invention have improved stability against oxidation, heat, light and moisture and will retain their color for a much longer time than their corresponding untreated counterparts. Moreover, the solubility of the treated pigment is also improved so as to provide even greater clarity in liquid applications. Furthermore, by virtue of the present invention, pigment complexes are produced which are water-soluble at an acidic pH so that they can be employed in liquid beverage applications which are typically at a pH of about 3.0 to 3.5. Thus, by the present process, applicants are able to provide natural pigments which produce yellow or orange colors in a liquid beverage at acidic pH conditions. More specifically, a norbixin pigment complex prepared by the present invention will provide an orange color in an aqueous acidic environment at a concentration from 0.0008% to 0.001% by weight of pigment. When employed in a more dilute concentration, namely, from 0.00008% to 0.0001% by weight of pigment, a yellow color is imparted.

The stabilized pigments of the present invention may be employed in a variety of uses including food applications such as dry beverage mixes, liquid beverage products, pharmaceutical applications, cosmetics, and the like.

Having described the basic concepts of this invention, the following Examples are set forth to illustrate the same in which the parts and percentages are by weight. These Examples are not, however, to be construed as limiting the invention in any manner.

EXAMPLE 1

A commercially available (Miles Laboratories, Inc.) annatto food colorant (26° Brix, pigment concentration 2.8%) in which the pigment is primarily norbixin is adjusted to provide a 0.168% by weight aqueous solution of pigment at a pH of 11.6 using potassium hydroxide. 60 ml of this annatto solution (100.8 mg norbixin) is then combined with 40 ml of a 10% by weight aqueous gum arabic solution (4,000 mg gum arabic containing 38.9 mg of calcium and magnesium). This mixture is stirred for 30 minutes at ambient temperature and the pH is then adjusted with hydrochloric acid to 3.0.

The resultant colorant preparation is then subjected to vacuum distillation at a temperature of 50° C. to a final concentration of 30° Brix to provide a liquid concentrate. Using this liquid concentrate, a dry powder preparation of this colorant, which contains about 2% by weight of pigment, is obtained by spray drying the liquid concentrate at an inlet temperature of 150° C. and an outlet temperature of 75° C.

EXAMPLE 2

The spray dried powder preparation prepared in Example 1 is used as a coloring material for a liquid, orange flavored beverage having the following composition:

| | |
|---|---|
| Water | 82.00% by weight |
| High fructose corn syrup (42° Brix) | 17.46% |
| Citric acid | 0.15% |
| Potassium citrate | 0.05% |
| Orange extract | 0.30% |
| Norbixin/gum arabic powder | 0.04% |

A clear, orange colored beverage is thus obtained having a pH of 3.5.

EXAMPLE 3

(Comparison Example)

A beverage identical to the one prepared in Example 2 is prepared in this Example with the only exception that the untreated norbixin food colorant of Example 1 is employed. The amount of pigment used in each of the beverages is identical. The beverage of Example 2 and the beverage of this Example is hot-filled into clear glass bottles and the samples are stored in the dark at room temperature. The beverages are monitored for color retention at regular time intervals by spectrophotometric measurements. The results are as follows:

| | Percent Color Retention | | | | |
|---|---|---|---|---|---|
| | Storage Time (weeks) | | | | |
| Sample | 1 | 4 | 8 | 12 | 16 |
| Beverage with treated norbixin | 98 | 97 | 95 | 92 | 92 |
| Beverage with untreated norbixin | 82 | 10 | 0 | 0 | 0 |

As is clearly seen from the above table, the beverage containing the treated norbixin shows superior color retention in this beverage application as compared to the beverage employing the untreated pigment. Moreover, the beverage solution containing the treated pigment also remains substantially optically clear. In contrast, the beverage colored with the untreated norbixin becomes very cloudy after only two days of storage due to the insoluble nature of annatto pigments at an acidic pH.

EXAMPLE 4

An aqueous solution is prepared with 822 g of a commercially available (Miles Laboratories, Inc.) annatto food colorant (26° Brix, pigment concentration 2.45%) in which the pigment is primarily norbixin and 7393 g of water to form a 0.245% by weight norbixin solution. The pH of this solution is adjusted to 10.5 with potassium hydroxide. To this solution, 6.9 g of calcium chloride dihydrate dissolved in 233 g of water and an additional 21.22 kg of water are added. After this mixture is stirred for 30 minutes, 470 g of gum arabic dissolved in 23 kg of water are added. This mixture is stirred for an additional 30 minutes and the pH is then adjusted to 3.5 with hydrochloric acid.

To this colorant preparation, 250 g of maltodextrin (Maltrin M-100, Grain Processing Corp,. Muscatine, Iowa) are added and a 23° Brix liquid concentrate is prepared by distillation under 0.76 kg/sq. cm. vacuum at a temperature of 70° C. A dry powder preparation of this colorant containing about 2% by weight of pigment is then prepared by spray drying the 23° Brix concentrate at an inlet temperature of 150° C. and an outlet temperature of 75° C.

The colorant preparation containing the norbixin complex is used as a coloring material for a dry soft drink mix having the following composition:

| Sucrose | 92.79% by weight |
| --- | --- |
| Ascorbic acid | 0.12% |
| Citric acid | 4.61% |
| Sodium citrate | 1.80% |
| Orange flavor | 0.50% |
| Colorant powder | 0.18% |

Upon the addition of 240 ml cold water to 22 g of the above dry mix, a soft drink is obtained having an orange color at a pH of 3.5 with excellent clarity.

EXAMPLE 5

An aqueous solution containing 0.074% by weight of norbixin pigment is prepared from a commercially available (Miles Laboratories, Inc.) annatto food colorant in which the pigment is primarily norbixin and the pH is adjusted to 12.0 with potassium hydroxide. 8.0 ml (5.9 mg norbixin) of this solution is added to 0.62 ml of a 3% by weight aqueous solution of magnesium citrate tetradecahydrate and the pH adjusted to 12.0 with potassium hydroxide. This mixture is stirred for 40 minutes at ambient temperature and then 10.0 ml of a 2% by weight aqueous solution of low-methoxyl pectin (Hercules, Inc., Middletown, N.Y.) are added (200 mg pectin). After this mixture is stirred for 40 minutes, the pH of the resulting colorant preparation is adjusted to 3.0 with hydrochloric acid.

EXAMPLE 6

A commercially available bixin food colorant is obtained in dry powdered form. (Chr. Hansen's Laboratory, Inc.). An aqueous dispersion is prepared containing 1.35% by weight of the bixin pigment and the pH is adjusted to 12.5 with potassium hydroxide to solubilize the bixin and form a solution. To 2.5 ml of this bixin solution, 10.0 ml of a 10% by weight aqueous solution of gum arabic are added and the volume adjusted to 25 ml with water. The mixture is stirred for 30 minutes at 40° C. and the pH is then adjusted to 3.5 with hydrochloric acid. The resultant colorant preparation is then diluted to a final volume of 100 ml with water to be used directly as a food coloring material for a hard candy with the following formulation:

| Sucrose, granulated | 57.84% by weight |
| --- | --- |
| Dextrose syrup, 58° Brix | 17.90% |
| Water | 19.67% |
| Citric acid | 0.69% |
| Colorant liquid | 3.90% |

A clear, orange colored hard candy is obtained having excellent color stability.

EXAMPLE 7

A commercially available beet juice concentrate (Beatrice Foods Company, Color-Treme R-111) in which the pigment consists primarily of betanin and vulgaxanthins is diluted with water by a factor of 4. The pH is then adjusted to 1.0 with hydrochloric acid and the solution stirred for 4 hours at ambient temperature. The solution is then adjusted to a pH of 5.0 with potassium hydroxide, poured into dialysis tubing, and dialysed for 8 hours against 4 changes of water. The pH of this partially purified beet juice is then adjusted to 8.0 with potassium hydroxide.

To 18.0 ml of this beet juice solution containing 0.039% by weight of pigment, 5.0 ml of a 3% by weight aqueous solution of calcium chloride dihydrate are added. This mixture is then stirred for 20 minutes at ambient temperature. 10 ml of a 2% by weight aqueous solution of gum arabic are then added. After the mixture is stirred for an additional 30 minutes, the pH is adjusted to 3.0 with hydrochloric acid. The mixture is then diluted to a final volume of 100 ml with water to be used directly as a food coloring material for a liquid raspberry beverage having the following composition:

| Water | 77.15% by weight |
| --- | --- |
| Sucrose | 12.34% |
| Potassium citrate | 0.04% |
| Citric acid | 0.21% |
| Malic acid | 0.21% |
| Ascorbic acid | 0.04% |
| Raspberry flavor | 0.01% |
| Liquid colorant | 10.00% |

A clear, red colored beverage is thus obtained having a pH of 3.5 and having excellent color stability.

EXAMPLE 8

A 0.074% by weight aqueous solution of norbixin pigment is prepared from a commercially available annatto food colorant in which the pigment is primarily norbixin. The pH is adjusted to 9.8 with potassium hydroxide. To 8.0 ml aliquots of this norbixin solution, the following divalent metal salt solutions are added, respectively:

(a) 0.40 ml of a 3% by weight aqueous solution of calcium chloride dihydrate.
(b) 1.10 ml of a 3% by weight aqueous solution of calcium ascorbate.
(c) 0.54 ml of a 3% by weight aqueous solution of magnesium chloride hexahydrate.
(d) 0.36 ml of a 3% by weight aqueous solution of zinc chloride.

The norbixin/divalent metal salt aliquots are stirred for 30 minutes. 6.0 ml of a 2% by weight aqueous solution of low methoxy pectin are then added to each of the respective aliquots. After each mixture is adjusted to a volume of 100 ml by the addition of water, it is stirred for 30 minutes, and the pH adjusted to 3.0 with hydrochloric acid. Each of the colorant preparations is then used directly as a food colorant to prepare a beverage similar to that prepared in Example 2.

Each of the respective beverage preparations has a clear, orange color and has a pH of 3.5.

EXAMPLE 9

A 0.245% by weight aqueous solution of norbixin pigment is prepared from a commercially available annatto food colorant in which the pigment is primarily norbixin and the pH adjusted to 11.0 using potassium hydroxide. 25 ml of a solution containing 0.25 g of propylene glycol alginate LVF (Kelco Division of Merck & Co., Inc., Chicago, Ill.) are added to 10 ml of the norbixin solution. The mixture is diluted to a final volume of 100 ml with water and stirred for 40 minutes. The pH is then adjusted to 3.0 with hydrochloric acid. The mixture is used directly as a food coloring material. Inasmuch as the alginate gum used in this Example contains 1.0% calcium and 0.01% by weight magnesium, no additional external source of divalent cation is required.

We claim:

1. A composition comprising and having the formula

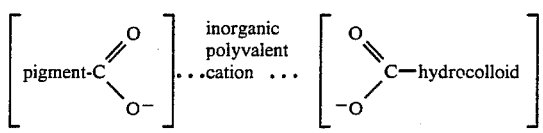

wherein the pigment and hydrocolloid each have at least one carboxyl group.

2. The composition of claim 1 wherein the pigment is selected from the group consisting of betanin, vulgaxanthins, bixin, norbixin, crocetin, and combinations thereof, and wherein the inorganic polyvalent cation is selected from the group consisting of the water-soluble salts of calcium, magnesium, manganese, zinc, copper, iron, aluminum, and combinations thereof, and wherein the hydrocolloid is selected from the group consisting of pectins, gums, gelatins, modified cellulose, derivatives thereof, salts thereof, and combinations thereof.

3. A process for forming stabilized pigments comprising combining at least one pigment, each pigment having at least one carboxyl group, with at least one inorganic polyvalent cation source and with at least one hydrocolloid, each hydrocolloid having at least one carboxyl group, in an aqueous alkaline medium.

4. A process according to claim 3 wherein the pigment is selected from the group consisting of betanin, vulgaxanthins, bixin, norbixin, crocetin, and combinations thereof, the inorganic polyvalent cation is selected from the group consisting of water-soluble salts of calcium, magnesium, manganese, zinc, copper, iron, aluminum, and combinations thereof, and the hydrocolloid is selected from the group consisting of pectins, gums, gelatins, modified cellulose, derivatives thereof, salts thereof, and combinations thereof.

5. A process according to claim 3 wherein the pH of the aqueous alkaline medium is in the range of from about 7.5 to 13.5.

6. A process according to claim 5 wherein the pH of the aqueous alkaline medium is in the range of from about 8.5 to 13.0.

7. A process according to claim 6 wherein the pH of the aqueous alkaline medium is in the range of from about 9.5 to 12.0.

8. A process according to claim 5 wherein the amount of polyvalent cation combined with pigment is from about 0.05 to 6.0 parts by weight of cation per part by weight of pigment on a dry weight basis.

9. A process according to claim 8 wherein the amount of polyvalent cation combined with pigment is from about 0.1 to 5.0 parts by weight of cation per part by weight of pigment on a dry weight basis.

10. A process according to claim 5 wherein the amount of hydrocolloid combined with pigment is from about 2 to 400 parts by weight of hydrocolloid per part of pigment on a dry weight basis.

11. A process according to claim 8 wherein the amount of hydrocolloid combined with pigment is from about 2 to 400 parts by weight of hydrocolloid per part of pigment on a dry weight basis.

12. A process according to claim 5 wherein the amount of hydrocolloid combined with pigment is from about 20 to 120 parts by weight of hydrocolloid per part by weight of pigment on a dry weight basis.

13. A process according to claim 9 wherein the amount of hydrocolloid combined with pigment is from about 20 to 120 parts by weight of hydrocolloid per part by weight of pigment on a dry weight basis.

14. A process according to claim 3 further comprising, after forming the stabilized pigment, adjusting the pH of the stabilized pigment to a pH of from about 1 to 7.

15. A process according to claim 11 or 13 further comprising, after forming the stabilized pigment, adjusting the pH of the stabilized pigment to a pH of from about 2 to 6.

16. A process according to claim 15 wherein the pH is adjusted to about 3 to 3.5.

17. A process according to claim 3 wherein the pigment is first combined with an aqueous medium and then the pH of the aqueous medium is adjusted to alkaline conditions, then the cation is combined with the aqueous alkaline medium and then the hydrocolloid is combined with the aqueous alkaline medium and the whole is mixed.

18. A process according to claim 3 wherein the pigment is combined with an aqueous alkaline medium, then the cation is combined with the aqueous alkaline medium and then the hydrocolloid is combined with the aqueous alkaline medium and the whole is mixed.

19. A process according to claim 3 further comprising concentrating the formed stabilized pigments.

20. A process according to claim 19 further comprising drying the concentrated stabilized pigment.

21. A process according to claim 3 further comprising drying the stabilized pigment.

22. The product of the process of claim 3 or 11 or 13 or 14.

23. The product of the process of claim 19 wherein the product contains 0.1% to 3.0% by weight of pigment.

24. The product of the process of claim 10 or 11 wherein the product contains at least 1% by weight of pigment.

25. The product of claim 24 wherein the product contains 2% to 10% by weight of pigment.

26. A composition comprising an aqueous acidic environment and the product of claim 23.

* * * * *

UNITED STATES PATENT AND TRADEMARK OFFICE
CERTIFICATE OF CORRECTION

PATENT NO. : 4,699,664
DATED : October 13, 1987
INVENTOR(S) : Navagnana S. Hettiarachchy, et al.

It is certified that error appears in the above-identified patent and that said Letters Patent is hereby corrected as shown below:

Column 10, line 67, claim 26, the "product of claim 23" should read -- product of claim 22 --.

Signed and Sealed this

Twelfth Day of April, 1988

Attest:

DONALD J. QUIGG

Attesting Officer

Commissioner of Patents and Trademarks